United States Patent [19]

Thorp

[11] 4,077,361

[45] Mar. 7, 1978

[54] BIRD FEEDER

[76] Inventor: Erik R. Thorp, 50 Benson Ave., Rumford, R.I. 02916

[21] Appl. No.: 691,509

[22] Filed: Jun. 1, 1976

[51] Int. Cl.² .................................. A01K 39/00
[52] U.S. Cl. ..................................... 119/52 R
[58] Field of Search ............... 119/51 R, 52 R, 53, 119/23, 61, 63, 52 B; D30/12–15; 220/9 R, 8, 252, 253

[56] References Cited

U.S. PATENT DOCUMENTS

| D. 165,628 | 1/1952 | Blazier | 119/53 X |
|---|---|---|---|
| 940,540 | 11/1909 | Loop et al. | 119/53 |
| 2,683,440 | 7/1954 | Klix | 119/52 R |
| 2,696,803 | 12/1954 | Deffenbaugh | 119/52 R |
| 2,804,844 | 9/1957 | Gigliotti | 119/52 R X |
| 2,866,435 | 12/1958 | Blazier | 119/53 |
| 3,022,768 | 2/1962 | Lynch | 119/23 |
| 3,648,661 | 3/1972 | Moore | 119/53 |
| 3,738,329 | 6/1973 | Schweitzer | 119/61 |
| 3,780,703 | 12/1973 | Boehland | 119/53 |
| 3,788,279 | 1/1974 | Boehland, Jr. | 119/52 R |
| 3,977,363 | 8/1976 | Fisher | 119/52 R |

Primary Examiner—Richard J. Apley
Attorney, Agent, or Firm—Robert J. Doherty

[57] ABSTRACT

This invention is directed to a feeder construction and one which is especially adapted as a bird feeder wherein a novel and cooperative container and closure configuration is presented in such a manner that a highly efficient and practical feeder is produced. In the most preferred form, the container takes the shape of a hollow toroid having an interfitting closure in the form of an encircling ring slidable within a recessed channel in the outer surface of the container. Spaced openings in the closure are capable of orientation with a fill opening within the container upon rotational movement there between so as to provide fill access to the container. The lower interior portion of the toroidal shaped container is provided with a feed access opening for birds and the like. Furthermore, by varying the size of the central laterally extending recess within the container, various species of birds may be restricted from access to the feed opening.

10 Claims, 9 Drawing Figures

BIRD FEEDER

BACKGROUND OF THE INVENTION

The prior art is replete with art directed to bird feeders. Many of these prior art constructions incorporate features which resemble the novel constructions disclosed herein or embody or accomplish certain advantages thereof in a related manner. However, the many advantages of the present feeder including efficient filling and feeding, restriction to desirable bird species, ease of operation are not only accomplished by a relatively straightforward and inexpensive to produce construction but one which is also capable of highly decorative appearances as well.

Bird feeder constructions which are generally cylinder-like in form are known as are those which require the feeding bird to project its head through a container portion or obstruction in order to gain access to feed. Other type feeders incorporate portions thereof which are relatively moveable with respect to each other and which further function as container closure portions.

Examples of actual or suggested bird feeder constructions which incorporate cylinder-like portions include U.S. Pat. No. 2,718,873 issued Sept. 27, 1955; U.S. Design Pat. No. 194,610 issued Feb. 19, 1963 and U.S. Design Pat. No. 234,615 issued Mar. 25, 1975. Examples of static structures in which the bird projects its head in to a feed opening include U.S. Pat. No. 2,699,753 issued Jan. 18, 1955; U.S. Pat. No. 3,780,703 issued Dec. 25, 1973 and U.S. Pat. No. 3,788,279 issued Jan. 29, 1974. Examples of constructions which employ relative movement between container and closure portions of a feeder construction include U.S. Pat. No. 2,683,440 issued July 13, 1954; U.S. Pat. No. 3,145,690 issued Aug. 25, 1964 and U.S. Pat. No. 3,244,150 issued Apr. 5, 1966. The above prior art patents and discussion thereof are believed representative of pertinent feeder constructions known and/or available at the present time.

Certain features are either necessary or highly desirable in a bird feeder construction. Such features include secure storage of feed material away from the elements yet easily accessible to desired bird species, the ability to refill and empty the container without undue complexity and the ability to bar undesirable species from feeding. It is significant to note that no prior art feeder construction accomplishes all these desirable aims through the provision of a feed container constructed of a shape which significantly contributes to the accomplishment of these aims. It is accordingly an object of the present invention to provide a bird feeder construction wherein the shape of the feed container itself is such that it not only provides access to birds of desirable species but by dimensional changes, may serve to bar bird species of varying sizes.

A further object of the present invention is the provision of a feed container having a laterally extending recess into which a bird may project itself in order to gain access to an interior feed opening, wherein both the entrance dimensions and the extent of such recess serves to control bird species which may feed.

A still further object of the present invention is a provision of a feeder construction having a hollow feed container portion and a closure portion which cooperatively function by relative movement therebetween to provide access to fill openings provided in the container portions thereof, such two piece feeder construction being further capable of fabrication from relative durable weather resistant materials such as resinous plastic compositions.

Still another object of the present invention is the provision of a bird feeder construction of the above elicited configurations which is of simple construction and is capable of low cost manufacturing which is also of a highly decorative appearance.

Still another object of the present invention is the provision of a bird feeder construction which incorporates a slidable closure element so constructed so that two components thereof may with ease move relative to each other and which resists water from entering between the engaging surfaces thereof in such a manner that freezing together of the two components when utilized in winter conditions is avoided.

These and other objects of the invention will be brought out in the following descriptive portions of the application.

DESCRIPTION OF THE INVENTION

Figure 1:
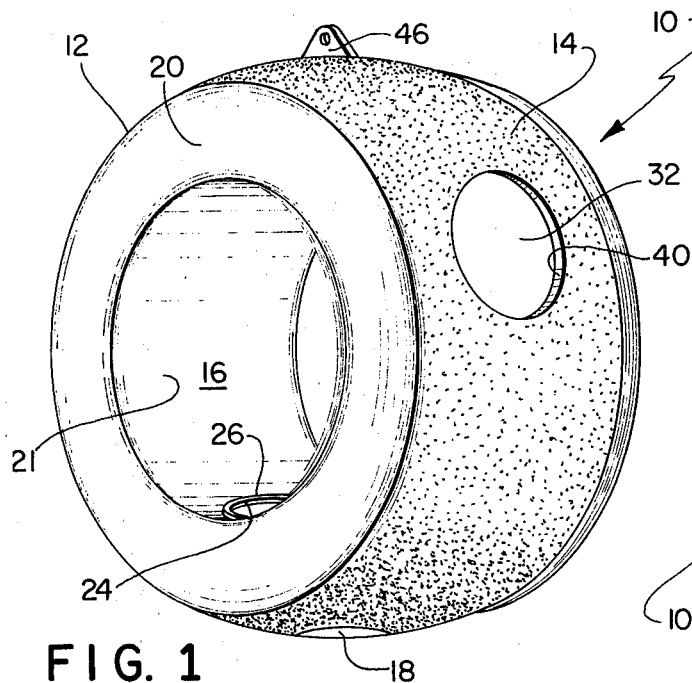
FIG. 1 is a perspective view of a bird feeder construction depicting one embodiment of the present invention.
Figure 2:
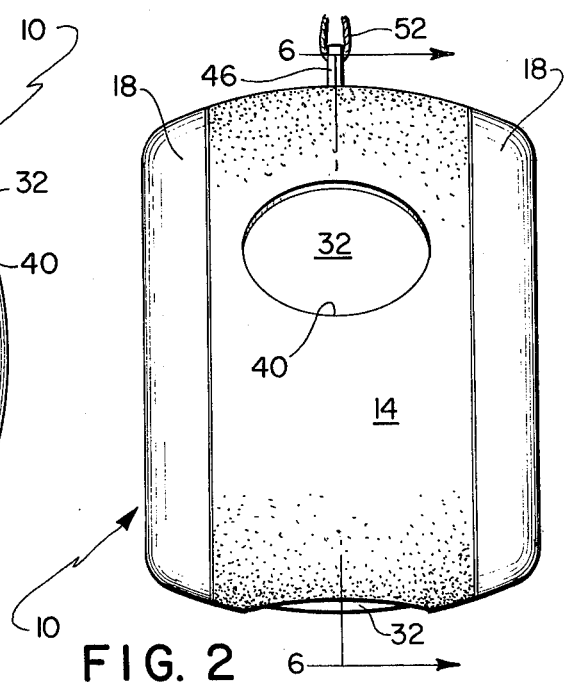
FIG. 2 is a side elevational view thereof.

Turning now to the drawings and more particularly FIG. 1 thereof, the feeder 10 is shown embodying the constructional features of the present invention. Such feeder 10 includes a container portion 12 and a closure portion 14. As depicted, the container 12 may preferably be of general toroidal configuration exhibiting inner side walls 16, outer walls 18 and connecting walls 20 which cooperatively form a laterally extending recess 21 which in the case of a toroidal shaped container extends entirely therethrough. The container 12 forms a hollow interior portion for receipt of feed material such as seed and the like; access to the interior thereof being had through a fill opening 22 in the top of the outer walls 18 forming the container 12.

A feed access opening 24 is provided through the inner wall 16 so that feeding birds may perch partially within the recess 21 of the container while gaining access to feed hold within the container through such opening 24. The feed opening 24 is preferably in a position opposed to the fill opening 22 and on the lower portion of the recess 21. The opening 24 is furthermore preferably bounded by an upstanding flange or side wall 26 which serves to divert water which can collect on the inner walls 16 of the container and downwardly flow towards the opening 24. The flange 26 otherwise serves to protect the feed within the container 12 from the elements such as wind or wind driven precipitation.

The diameter or other dimensional extent of the recess 21 in those cases where the container is not of toroidal shape and its lateral projection both serve to deter access to birds of a size larger than those species desired to be attracted. Accordingly, by sizing the container 12 and its recess 21, undesirable large birds which can either not fit within the recess or find a suitable perch thereon can be detracted from access to the feed opening 24 within the container.

The outer surface of the container is provided with a depressed channel 28 within the outer wall 18 thereof and formed by a pair of laterally spaced downwardly inwardly extending walls 30 and a bottom or connecting wall 32. As depicted, such channel 28 may completely encircle the container 12. It is through this bottom wall 32 that the opening 22 is provided at the top thereof and through which a plurality of drain openings 34 are disposed at the bottom portion thereof. The closure 14 in the form of an encircling ring is received within the channel 20 so as to preferably form a flush continuation of the outer surface 18 of the container 12. The lateral edges of closure 14 are provided with downwardly inwardly directed side walls 36 of such an extent so that they interfit with side walls 30 as depicted in the drawings. Such sidewalls 36 terminate in relatively narrow lower edge surfaces 38 which are adapted to engage upper lateral side surface portions of the lower connecting wall 32. The limited extent of this mutual surface engagement not only reduces the amount of effort required in order to move the feeder components relative to each other in frictional sliding contact but further serves to prevent ice freeze up as will be hereinafter brought out.

Figure 3:
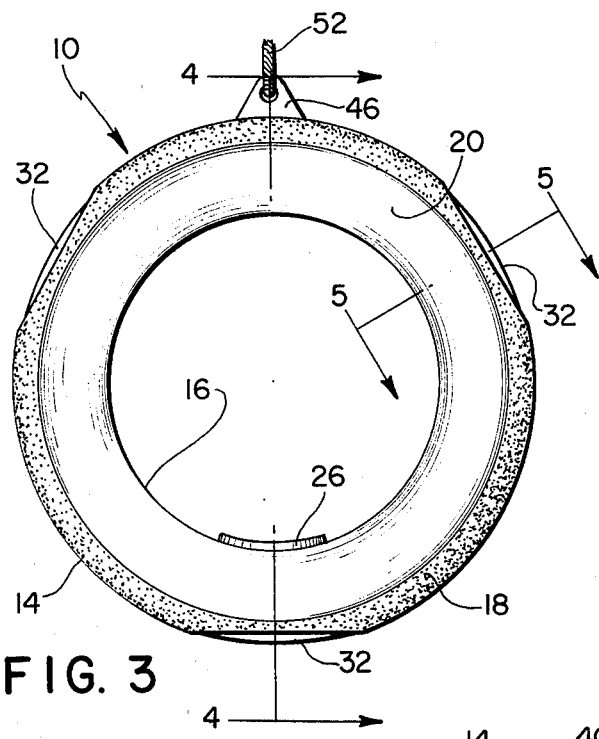
FIG. 3 is a front elevational view thereof.
Figure 4:
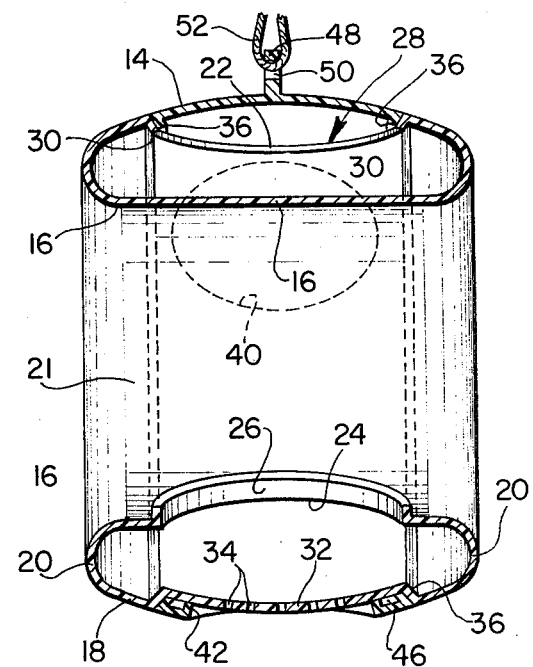
FIG. 4 is a side sectional view taken along the laterally projecting plane indicated by line 4—4 in FIG. 3.
Figure 6:
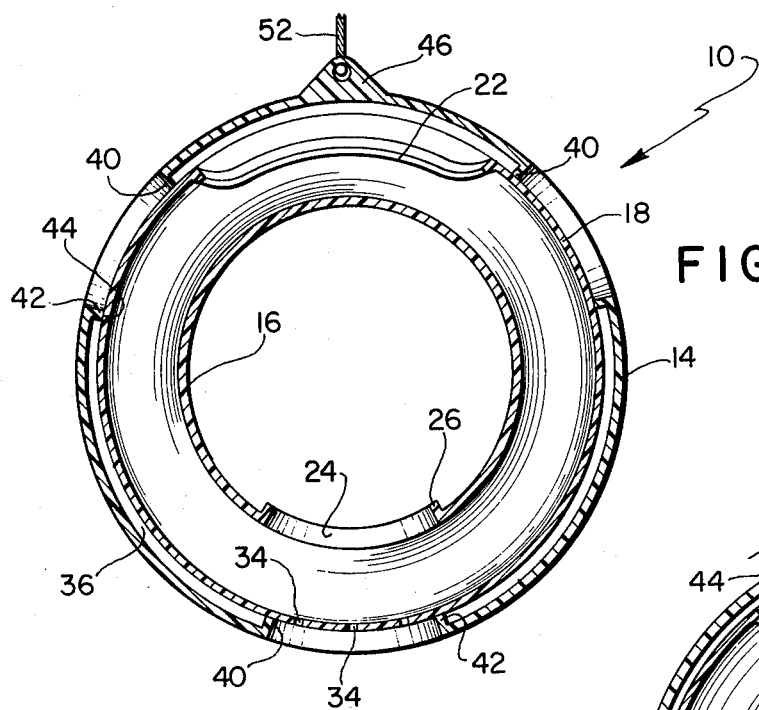
FIG. 6 is a front sectional view taken along the longitudinal plane indicated by the line 6—6 of FIG. 2.
Figure 7:
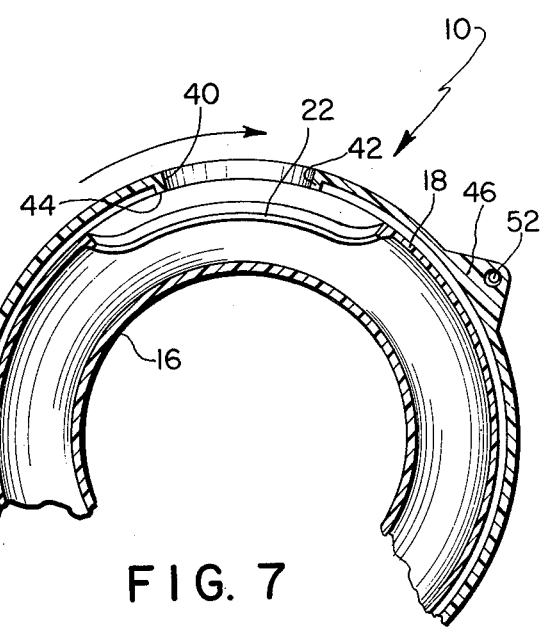
FIG. 7 is a partial sectional view similar to that shown in FIG. 6 but wherein the closure portion of the feeder has been moved relative to the container portion thereof to permit access to the fill opening therein.

The closure 14 is provided with a plurality of openings 40 generally depicted as circular in nature and within the lateral extent of the closure 14 although such is not necessarily a constructional requirement since the purpose of such openings 40 is to enable access to the fill opening 22 within the container 12 by a relative positioning or repositioning of such closure 14 with respect to the container 12. In the embodiment depicted, three such openings 40 are included at equidistant positions of 120° each, the two upper openings enabling access to the feed opening 22 by relative rotation of the closure 14 with respect to the container in either direction while the bottom opening 40 exposes the plurality of drain openings 34 at the bottom of the container 12 when the closure 14 is positioned in a feed position wherein the fill opening of the container is closed thereby. Such position is best depicted in FIG. 3 of the drawings. From such view as well as other views depicting this embodiment, once positioned within the channel 28 of the container 12, the closure 14 is adapted to rotate with respect thereto i.e. in a feed position as depicted in FIG. 6 of the drawings wherein the fill opening is covered thereby and wherein the drain openings 34 are exposed by alignment therewith of a lower opening 40; to a fill position depicted in FIG. 7 wherein one of the top openings 40 included in the closure 14 has been aligned with the fill opening 22 so that access to the interior portions of the container 12 may be had as a filling with fresh feed material. It should be apparent that the feed material is free to flow around the interior portions of the container 12, downwardly to a lowermost position and thus be accessible to birds through the access or feed opening 24. Although one feed opening is shown, it should be pointed out that more than one feed or access opening 24 may be positioned within the inner walls 16 of the container 12. However, the positioning of such an access or feed opening or openings within the confines of the recess 21 serves to permit access by birds up to a selected size and limit larger birds from full access. Also the cross sectional configuration of the other surface of the container i.e. of the channel 28, may be varied from that shown so long as it permits relative movement between the container 12 and closure portions 14 in the aforementioned manner.

Figure 5:
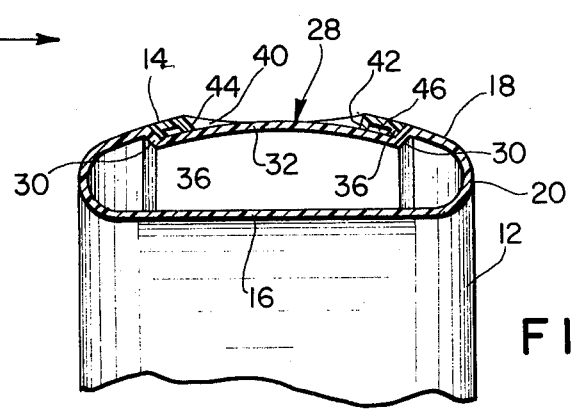
FIG. 5 is a similar side sectional view taken along the line 5—5 of FIG. 3.

A further feature of the present invention may be had by specific reference to FIG. 5 of the drawings wherein it is apparent that the openings 40 formed in the surface of the closure 14 are provided with downwardly inwardly extending peripheral side walls 42 terminating in lower edge portions 44 in turn adapted to rest upon and frictionally engage the upper surface of the connecting or bottom wall 32 of the channel 28. As previously indicated this combined relatively low degree of surface contact between the closure 14 and the container minimizes not only the frictional contact therebetween but also the chance the feeder components may be frozen together by icing conditions during winter use thereof. Such potential for freezing is further lessened and/or prevented by the surrounding side walls 42. Thus, water falling upon those portions of the bottom wall 32 exposed by the opening 40 is deflected before reaching the major area of frictional contact between the container 12 and the closure 14, that is, the interface portion between the side walls 36 of the closure 14 and the side walls 30 of the container channel 28. It should be further noted that a chamber 46 is formed between respective portions of the side walls 42, side walls 36, the bottom wall 32 and the top surface portions of the closure 14 which also accommodates some expansion for ice which may move past the initial barrier formed by the side walls 42. The top surface portion of the closure 14 is further provided with an upwardly extending tab 48 having an opening 50 there through for receipt of a rope 52 and the like so that the feeder 10 may be suspended appropriately from a tree or post or other supporting element.

Figure 8:
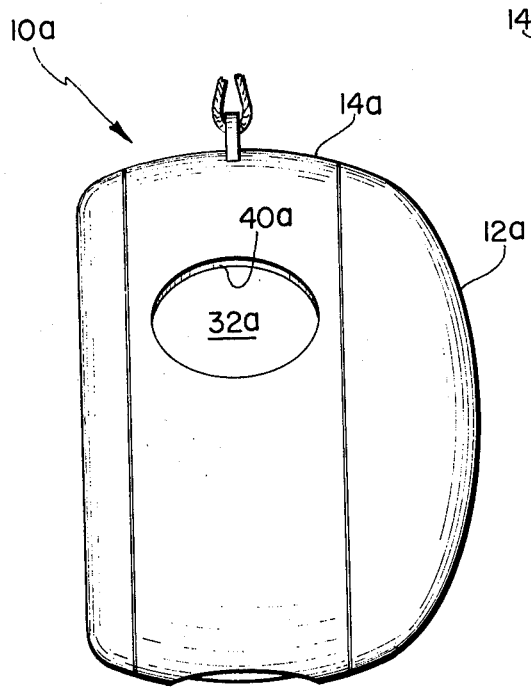
FIG. 8 is a side view of an alternative embodiment of the feeder construction similar to that shown in FIG. 5 of the drawings.
Figure 9:
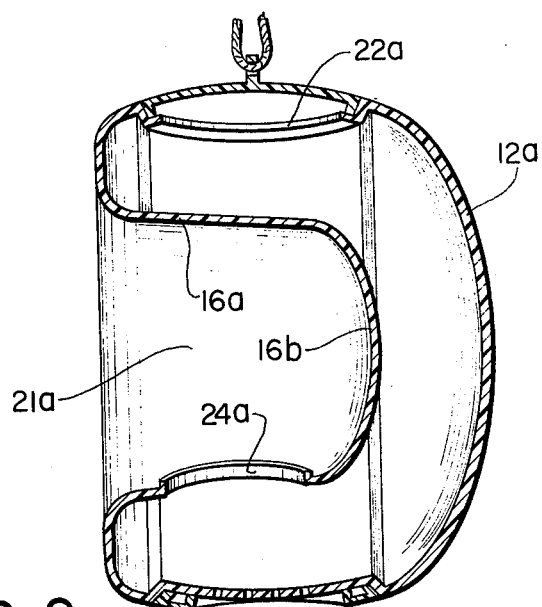
FIG. 9 is a side sectional view thereof similar to that depicted in FIG. 4 of the drawings.

Turning now to FIGS. 8 and 9 of the drawings, an alternate embodiment of the feeder 10 herein is shown. Therein, the lateral cross sectional configuration of the container 12 is formed of a C-shaped or upstanding "U" configuration so that the laterally extending recess or 21a is not only capable of being a restricted size by its surrounding inner walls 16a but further the lateral extent thereof may be regulated by the depth to which the root portion 16b of such inner wall extends, thus in this additional manner restricting the access of bird species to the feeder 10. As in the previous embodiment the interior of the container of the embodiment shown in FIGS. 8 or 9 is hollow and accordingly seed entering from the fill opening 22a in the top thereof is free to fall to the bottom portions thereof wherein access may be gained thereto through feed access opening 34a. The other constructional features of this embodiment remain as in that described in the previous embodiment.

It is believed that the present bird feeder construction embodies novel features which are either unavailable in the prior art or which necessitate use of differing feeder constructions and that such has been accomplished in a single construction which is not only inexpensive to produce but further is simple to operate and capable of assuming varying decorative appearances. Thus both the container and closure portions of the present feeder may preferably be formed of resinous compositions such as polyethylene or polypropylene whereby not only desirable operational interfitting of the parts thereof is accomplished but by forming the closure portions from differing colored materials than the container, enchanced decorative effects can be produced.

It should be further understood that variations and modifications and special adaptions of the embodiments of the present invention may be utilized without departing from the scope of the present invention as set forth in the following claims.

I claim:

1. A feeding device for birds and the like including separate container and closure portions, said container having spaced inner and outer walls defining a hollow interior for receipt of feed, said inner walls in part defining a laterally extending recess within the container, said inner wall further having an interior access feed opening therethrough to permit birds at least partially within said recess to gain access to seed within said container, the outer walls of said container having at least one interior access fill opening through which the container may be filled with seed, said closure being movable relative to said container to selectively open and close said fill opening, said closure including at least one opening therethrough and said container outer wall at least proximate said fill opening including means for receiving said closure in slidable contact therewith wherein the closure opening can be selectively aligned and misaligned with said outer wall fill opening to respectively open and close said fill opening, said means for receiving said closure including a recessed channel longitudinally orientated along the outer surface of said container, said channel having spaced downwardly orientated walls and a connecting bottom wall, said closure having a top surface adapted for generally flush positioning with respect to the outer container wall portions proximate said recessed channel.

2. The device in accordance with claim 1 wherein said container outer surface is of a generally circular longitudinal cross-sectional configuration and said closure is an encircling ring.

3. The device in accordance with claim 2 wherein said fill opening is disposed at the top of said container and wherein container outer wall drain openings are located at the bottom thereof, said encircling ring closure having at least one upper opening and at least one lower opening to permit respective alignment with said fill and drain openings of said container outer wall.

4. The device in accordance with claim 3 wherein said ring includes three equidistantly spaced openings disposed at 120° intervals whereby slidable movement of said closure with respect to said container in either direction may serve to selectively cover and uncover said fill opening.

5. The device in accordance with claim 2 wherein said interior access feed opening is positioned in the lower interior surface of said container and is surrounded by an upwardly extending peripheral wall.

6. The device in accordance with claim 1 wherein said closure includes downwardly extending opposed side walls terminating in narrow lower edge surfaces adapted to contact said channel bottom wall with minimal engagement therewith.

7. The device in accordance with claim 6 wherein each of said closure openings includes a downwardly extending peripheral wall inwardly spaced from a respective closure side wall in turn terminating in narrow lower edge surfaces similarly adapted for minimal contact with said channel bottom wall, the cooperation of said bottom wall, said closure top surface, said closure side walls and said peripheral walls surrounding said closure openings defining relatively closed chambers.

8. The device in accordance with claim 7 wherein said container is of generally toroidal configuration and said closure is an encircling ring.

9. The device in accordance with claim 8 wherein said container is of a generally C-shaped lateral cross sectional configuration and wherein said laterally extending container recess terminates at the container inner wall portion forming the root of said C-shape.

10. The device in accordance with claim 8 wherein said interior access feed opening is positioned in the lower interior surface of said toroidal shaped container and is in turn surrounded by an upwardly extending peripheral wall.

* * * * *